(12) United States Patent
Kilchyk et al.

(10) Patent No.: US 11,846,199 B2
(45) Date of Patent: Dec. 19, 2023

(54) ROTOR CONTAINMENT STRUCTURE

(71) Applicant: Hamilton Sundstrand Corporation, Charlotte, NC (US)

(72) Inventors: Viktor Kilchyk, Lancaster, NY (US); Christopher Simpson, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/587,883

(22) Filed: Jan. 28, 2022

(65) Prior Publication Data
US 2023/0243274 A1 Aug. 3, 2023

(51) Int. Cl.
*F01D 25/24* (2006.01)
*F01D 21/04* (2006.01)
*F01D 25/00* (2006.01)

(52) U.S. Cl.
CPC ......... *F01D 21/045* (2013.01); *F01D 25/005* (2013.01); *F01D 25/243* (2013.01); *F05D 2220/34* (2013.01); *F05D 2240/14* (2013.01); *F05D 2250/18* (2013.01); *F05D 2300/603* (2013.01)

(58) Field of Classification Search
CPC .... F01D 21/045; F01D 25/005; F01D 25/243; F05D 2220/34; F05D 2240/14; F05D 2250/18; F05D 2300/603
See application file for complete search history.

(56) References Cited

U.S. PATENT DOCUMENTS

| | | | | |
|---|---|---|---|---|
| 3,088,279 A | * | 5/1963 | Diedrich | F23R 3/42 60/726 |
| 3,719,365 A | * | 3/1973 | Emmerson | F01D 11/12 415/117 |
| 5,403,148 A | * | 4/1995 | Forrester | F01D 21/045 415/200 |
| 5,885,056 A | * | 3/1999 | Goodwin | F01D 21/045 415/200 |

(Continued)

OTHER PUBLICATIONS

Extended European Search for European Patent Application No. 23153337.3, dated Jun. 14, 2023, 9 pages.

*Primary Examiner* — David E Sosnowski
*Assistant Examiner* — Theodore C Ribadeneyra
(74) *Attorney, Agent, or Firm* — Kinney & Lange, P.A.

(57) ABSTRACT

A containment structure for a rotor includes a shroud and a shroud reinforcement. The shroud is coaxial with and partially surrounds the rotor and includes a tubular section, a transition section, and a flange section. The tubular section extends axially past a first side of the rotor. The transition section connects to the tubular section and is adjacent to a curved side of the rotor. The flange section connects to the transition section opposite the tubular section. The flange section extends radially past a radially outer side of the rotor. The shroud reinforcement is connected to a radially outer surface of the transition section. The shroud reinforcement encloses the transition section and includes a support scaffold and a reinforcing material. The support scaffold includes a series of geometric retaining features encircling a radially outer surface of the transition section. The reinforcing material couples to the support scaffold and restricts shroud radial expansion.

15 Claims, 4 Drawing Sheets

(56) References Cited

U.S. PATENT DOCUMENTS

| | | | |
|---|---|---|---|
| 6,179,551 B1* | 1/2001 | Sathianathan | F01D 21/045 415/197 |
| 6,290,455 B1* | 9/2001 | Hemmelgarn | F01D 21/045 415/174.4 |
| 6,394,746 B1* | 5/2002 | Sathianathan | F01D 21/045 415/173.4 |
| 6,637,186 B1* | 10/2003 | Van Duyn | F01D 21/04 60/226.1 |
| 7,255,528 B2* | 8/2007 | Stretton | F04D 29/644 415/196 |
| 8,191,254 B2* | 6/2012 | Cardarella, Jr. | F04D 25/16 29/889.2 |
| 8,317,456 B2* | 11/2012 | Cardarella, Jr. | F02K 3/04 415/174.4 |
| 8,596,967 B2* | 12/2013 | Rosen | F01D 25/24 415/173.1 |
| 8,858,156 B2 | 10/2014 | Swenson et al. | |
| 10,557,358 B2 | 2/2020 | Creed et al. | |
| 10,876,427 B2* | 12/2020 | Braun | F01D 25/243 |
| 11,002,294 B2* | 5/2021 | Klaassen | F04D 29/526 |
| 2001/0028840 A1* | 10/2001 | Booth | F01D 21/045 415/173.1 |
| 2003/0138316 A1 | 7/2003 | Sathianathan et al. | |
| 2004/0018102 A1* | 1/2004 | Wand | F01D 9/026 417/407 |
| 2006/0013681 A1* | 1/2006 | Cardarella, Jr. | F01D 11/22 415/1 |
| 2010/0098538 A1 | 4/2010 | Bajay et al. | |
| 2012/0039703 A1* | 2/2012 | Swenson | F01D 21/045 29/700 |
| 2012/0141258 A1 | 6/2012 | Makulec et al. | |
| 2016/0265388 A1* | 9/2016 | Annati | F02B 37/24 |
| 2016/0273388 A1* | 9/2016 | Yoshida | F01D 25/08 |
| 2018/0100519 A1* | 4/2018 | Klaassen | F04D 29/526 |
| 2019/0153898 A1* | 5/2019 | Braun | F02C 6/12 |
| 2020/0157968 A1* | 5/2020 | Braun | F01D 21/045 |
| 2020/0165936 A1* | 5/2020 | Kasal | B22F 3/15 |
| 2021/0017881 A1* | 1/2021 | Diaz | B22F 5/009 |
| 2021/0317751 A1* | 10/2021 | Mee | B32B 5/26 |

\* cited by examiner

ROTOR CONTAINMENT STRUCTURE

BACKGROUND

This disclosure relates to rotor containment in a rotary machine and, more specifically, a shroud with shroud reinforcement around a rotor.

Containment refers to a first component confining a second component within a machine if the second component mechanically fails. Containment is necessary in rotary machines on aircraft because many devices and people are fit into a small space. Should a rotating component break, high centrifugal forces acting on that component will send the component into other devices, structures, or passengers on the aircraft.

Containment for a rotating component is typically measured in grams of material necessary to surround the component. However, aircraft and systems on the aircraft are more efficient when the aircraft is lighter. High strength-to-weight ratio materials have been used for containment in axial fans. Such coatings shift when the axial fans are running because the non-bias materials used do not stretch or expand with the containment pieces they coat.

SUMMARY

A containment structure for a rotor includes a shroud and a shroud reinforcement. The shroud is coaxial with and partially surrounds the rotor and includes a tubular section, a transition section, and a flange section. The tubular section extends axially past a first side of the rotor. The transition section connects to the tubular section and is adjacent to a curved side of the rotor. The flange section connects to the transition section opposite the tubular section. The flange section extends radially past a radially outer side of the rotor. The shroud reinforcement is connected to a radially outer surface of the transition section. The shroud reinforcement encloses the transition section and includes a support scaffold and a reinforcing material. The support scaffold includes a series of geometric retaining features encircling a radially outer surface of the transition section. The reinforcing material couples to the support scaffold and restricts shroud radial expansion.

A rotary machine includes a compressor section, a turbine section, and a shaft. The compressor section includes a compressor housing, a compressor rotor, a diffuser, and a compressor shroud. The compressor housing has a compressor inlet, a compressor outlet, and a compressor duct between the compressor inlet and the compressor outlet. The compressor rotor is in the compressor duct. The diffuser is in the compressor duct downstream from the compressor rotor. The compressor shroud is connected to the compressor housing near the compressor inlet and the diffuser. The compressor shroud is coaxial with the compressor rotor. The turbine section is connected to the compressor section and includes a turbine housing, a turbine rotor, a turbine shroud, a turbine nozzle, and a turbine shroud reinforcement. The turbine housing includes a turbine inlet, a turbine outlet, and a turbine duct between the turbine inlet and the turbine outlet. The turbine rotor is in the turbine duct. The turbine shroud is coaxial with and partially surrounds the turbine rotor and connects to the turbine housing. The turbine shroud reinforcement encircles a section of the turbine shroud. The turbine shroud reinforcement includes a first support partially enclosing the turbine shroud and a first reinforcing material coupled to the first support scaffold. The first reinforcing material restricts turbine shroud radial expansion. The shaft mechanically connects the compressor rotor and the turbine rotor.

A shroud reinforcement partially surrounds a shroud. The shroud reinforcement includes a support scaffold and a reinforcing material. The support scaffold includes a series of geometric retaining features that encircle a section of the shroud. The bands are spaced axially along the shroud. The reinforcing material couples to the support scaffold. The reinforcing material restricts shroud radial expansion.

DETAILED DESCRIPTION

Figure 1:
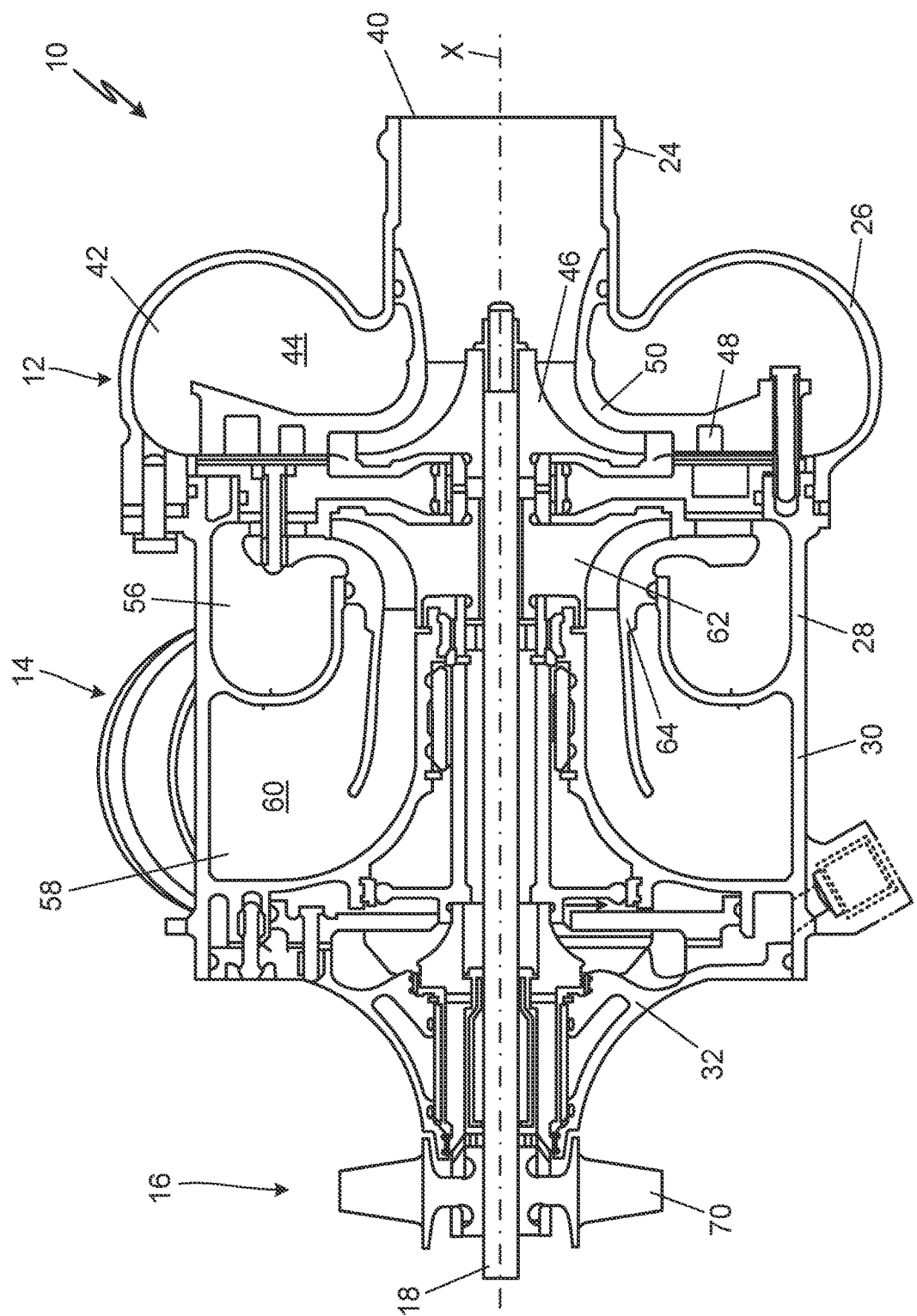
FIG. 1 is a cross-sectional view of a prior art rotary machine.

FIG. 1 is a cross-sectional view of prior art air cycle machine 10. Air cycle machine 10 includes compressor section 12, turbine section 14, fan section 16, and shaft 18. Compressor section 12 includes compressor inlet housing 24 and compressor duct housing 26. Turbine section 14 includes turbine inlet housing 28 and turbine duct housing 30. Fan section 16 includes fan housing 32. Compressor section 12 also includes compressor inlet 40, compressor outlet 42, compressor duct 44, compressor rotor 46, diffuser 48, and compressor shroud 50. Turbine section 14 includes turbine inlet 56, turbine outlet 58, turbine duct 60, turbine rotor 62, and turbine shroud 64. Fan section 16 includes blades 70. FIG. 1 also includes axis X.

In air cycle machine 10, compressor section 12, turbine section 14, and fan section 16 that are all mounted on shaft 18. Shaft 18 rotates around central axis X. Compressor inlet housing 24 and compressor duct housing 26 are a housing for compressor section 12. Compressor inlet housing 24 and compressor duct housing 26 are an integral piece with compressor inlet housing 24 connected to a first side of compressor duct housing 26. Turbine inlet housing 28 and turbine duct housing 30 are an integral housing for turbine section 14. Turbine inlet housing 28 connects to a second side of compressor duct housing 26. Fan housing 32 connects to turbine duct housing 30 on a side opposite turbine inlet housing 28. Fan housing 32 is a housing for fan section 16.

Compressor section 12 includes compressor inlet 40, compressor outlet 42, compressor duct 44, compressor rotor 46, diffuser 48, and compressor shroud 50. Compressor inlet 40 is an opening in compressor inlet housing 24. Compressor outlet 42 is an opening in compressor duct housing 26. Compressor duct 44 fluidly connects compressor inlet 40 with compressor outlet 42. Compressor rotor 46 is within compressor duct 44 and mechanically connected to shaft 18. Diffuser 48 is within compressor duct 44 and located radially outward from compressor rotor 46. A first portion of compressor shroud 50 connects to a radially inner surface of compressor inlet housing 24. A second portion of compressor shroud 50 connects to diffuser 48. Compressor shroud 50 partially surrounds compressor rotor 46.

Turbine section 14 includes turbine inlet 56, turbine outlet 58, turbine duct 60, turbine rotor 62, and turbine shroud 64. Turbine inlet 56 is an opening into turbine inlet housing 28. Turbine outlet 58 is an opening in turbine duct housing 30. Turbine duct 60 fluidly connects turbine inlet 56 with turbine outlet 58. Turbine rotor 62 is within turbine duct 60. Turbine rotor 62 mechanically connects to shaft 18. Turbine shroud 64 connects to turbine inlet housing 28. Turbine shroud 64 is radially outward from and partially surrounds turbine rotor 62. Turbine shroud 64 includes a turbine nozzle towards a downstream portion of turbine shroud 64.

Fan section 16 includes fan blades 70. Fan blade 70 is mounted on shaft 18. Fan blades 70 rotate with shaft 18. Fan section 16 draws in ram air from a ram air scoop or, alternatively, from an associated gas turbine or other aircraft component. Fan section 16 may also be used to draw air through a heat exchanger.

Air is received in air cycle machine 10 at compressor inlet 40. Air sources include ram air, an associated gas turbine engine or another aircraft component. The air passes through compressor section 12 where the air is compressed with compressor rotor 46 and diffuser 48. Compressor outlet 42 discharges the air from compressor section 12. Compressed air can pass through a heat exchanger and be used for other processes on an aircraft. Compressor shroud 50 provides containment in case of catastrophic failure of compressor rotor 46.

Air is routed into turbine inlet 56 from the heat exchanger or other places where compressed air is necessary in an aircraft. The air expands and drives turbine rotor 62 as it passes through turbine section 14. The turbine nozzle on turbine shroud 64 helps decrease the pressure of air moving through turbine shroud 64. Air is discharged out of turbine outlet 58 and can then be routed to other parts of the aircraft, for example, for use as cabin air. Turbine shroud 64 provides containment in case of catastrophic failure of turbine rotor 62.

Compressor shroud 50 and turbine shroud 64 provide containment for compressor rotor 46 and turbine rotor 62, respectively. Containment refers to the ability of a first component to confine a second component upon the second component mechanically failing. Containment is necessary to protect passengers and other aircraft systems from projectile rotary machine components and to comply with aircraft safety regulations. The amount of containment necessary is measured in grams of material. A heavier rotor requires more grams of material. However, increasing the weight of containment on compressor shroud 50 and turbine shroud 64 make air cycle machine 10 heavier overall and less ideal for use in aircraft.

Figure 2:
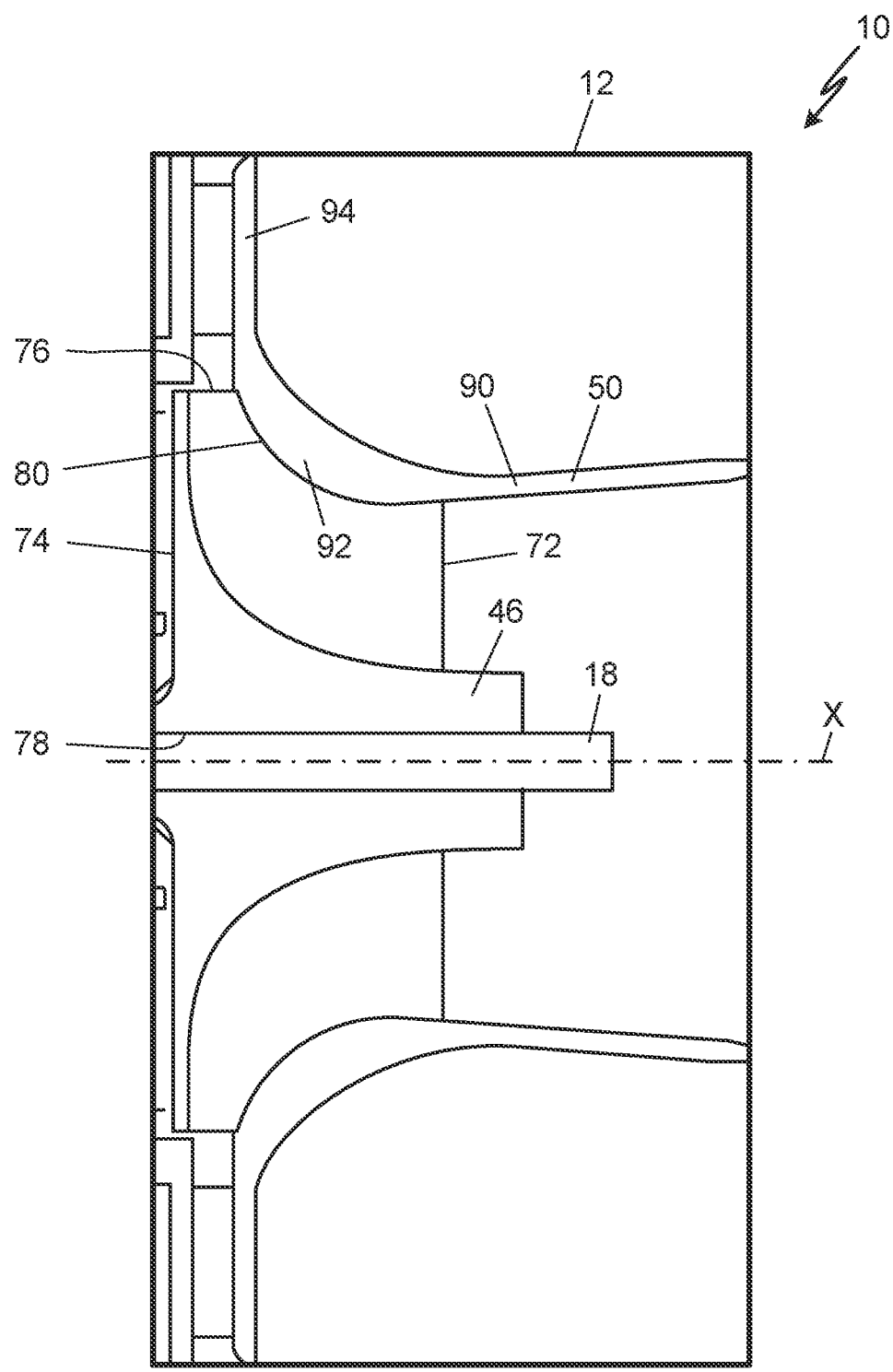
FIG. 2 is a cross-sectional view of a portion of the prior art rotary machine with a prior art compressor shroud.

FIG. 2 is a cross-sectional view of a portion of rotary machine 10 with prior art compressor shroud 50. Turbine shroud 64 of turbine section 14 (shown in FIG. 1) includes similar structures as shroud 50. FIG. 2 shows shaft 18, compressor rotor 46, and compressor shroud 50. Compressor rotor 46 includes first side 72, second side 74, radially outer side 76, bore 78, and curved side 80. Compressor shroud 50 includes tubular section 90, transition section 92, and flange section 94.

First side 72 of compressor rotor 46 is oriented toward the right side of FIG. 2. Second side 74 is opposite first side 72. Radially outer side 76 is radially away from axis X. Bore 78 of compressor rotor 46 is opposite radially outer side 76. Bore 78 ties compressor rotor 46 to tie shaft 18. Curved side 80 is between first side 72 and radially outer side 76 of compressor rotor 46.

Compressor shroud 50 includes tubular section 90, transition section 92, and flange section 94. Tubular section 90 extends axially past first side 72 of compressor rotor 46. A first end of transition section 92 connects to tubular section 90. Transition section 92 is a curved section of compressor shroud 50 and is adjacent to curved side 80 of compressor rotor 46. Transition section 92 is thickened to include more metal to provide containment for compressor rotor 46. Flange section 94 connects to a second end of transition section 92. Flange section 94 extends radially past outer side 76 of compressor rotor 46. Compressor shroud 50 is typically made of a metal, like aluminum.

Thickening transition section 92 in compressor shroud 50 provides containment for compressor rotor 46. Turbine shroud 64 similarly has a thickened transition section that provides containment for turbine rotor 62. Containment is necessary because rotors, like compressor rotor 46 and turbine rotor 62, are subject to high centrifugal force when operating. Containment protects passengers and other aircraft systems from projectile rotary machine components should compressor rotor 46 or turbine rotor 62 mechanically fail. Containment is also necessary to comply with aircraft safety regulations. The amount of containment necessary for a component like compressor rotor 46 or turbine rotor 62 is measured in grams of material. A heavier rotor requires more grams of containment. However, increasing the weight of containment on compressor shroud 50 and turbine shroud 64 make air cycle machine 10 heavier overall and less ideal for use in aircraft.

Air cycle machine 10 also heats when operating. Air entering air cycle machine 10 from a turbine engine is warm and gets warmer as it is compressed, so compressor section 12 heats as air cycle machine 10 operates. Further, air cools when moving through turbine section 14 and residual heat is transferred to components in turbine section 14. As air cycle machine 10 operates and heats, components within it expand.

Figure 3:
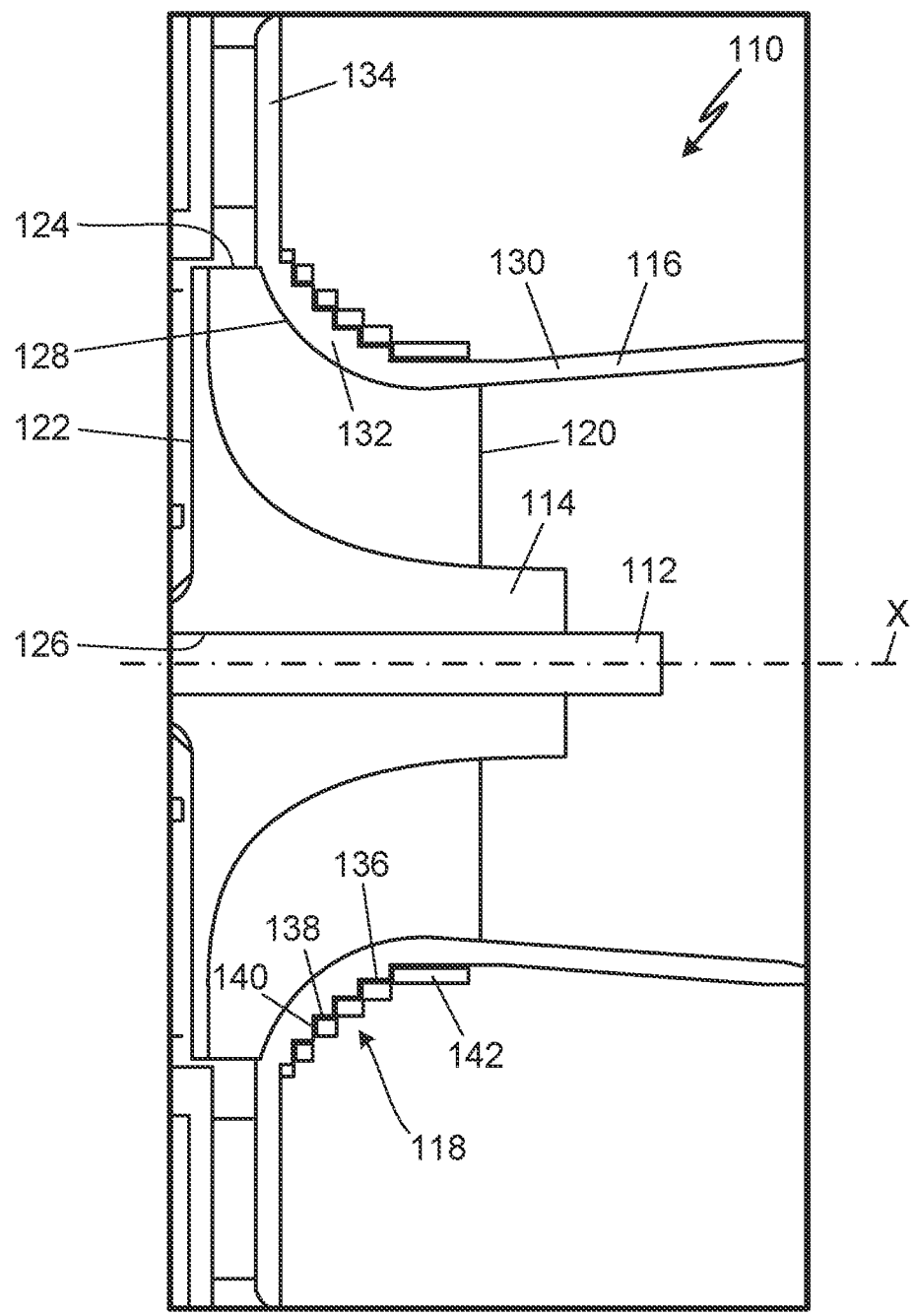
FIG. 3 is a cross-sectional view of a portion of a rotary machine with a first embodiment of a rotor containment structure.

FIG. 3 is a cross-sectional view of a portion of rotary machine 110 with shroud reinforcement 118. FIG. 3 includes rotating shaft 112, rotor 114, shroud 116, and shroud reinforcement 118. Rotor 114 includes first side 120, second side 122, radially outer side 124, bore 126, and curved side 128. Shroud 116 includes tubular section 130, transition section 132, and flange section 134. Shroud reinforcement 118 includes support scaffold 136, made of geometric retaining features including axial treads 138 and radial risers 140, and reinforcing material 142. FIG. 3 also includes axis X.

Rotary machine 110 is like compressor section 12 in air cycle machine 10 (shown in FIG. 1). Rotary machine 110 could alternatively be a turbine, like turbine section 14 (shown in FIG. 1) or any other type of rotary machine that requires containment around a rotor. Rotating shaft 112 is colinear with and rotates about axis X. Rotor 114 is mechanically tied to and rotates with rotating shaft 112. Shroud 116 is colinear with and partially surrounds rotor 114. Shroud reinforcement 118 encircles and is connected to a radially outer surface of shroud 116. Shroud 116 and shroud reinforcement 118 are a rotor containment structure.

Rotor 114 includes first side 120, second side 122, radially outer side 124, bore 126, and curved side 128. First side 120 is oriented toward the right of FIG. 3. Second side 122 is opposite first side 120. Radially outer side 124 is radially away from axis X. Bore 126 of rotor 114 is opposite radially outer side 124. Bore 126 ties rotor 114 to rotating shaft 112. Curved side 128 is between first side 120 and radially outer side 124.

Shroud 116 includes tubular section 130, transition section 132, and flange section 134. Tubular section 130 extends axially past first side 120 of rotor 114. A first end of transition section 132 connects to tubular section 130. Transition section 132 is a curved section of shroud 116 and is adjacent to curved side 128 of rotor 114. Transition section 132 is much thinner than prior art transition section 92 (shown in FIG. 2). Flange section 134 of shroud 116 connects to a second end of transition section 132. Flange section 134 extends radially past outer side 124 of rotor 114.

Shroud reinforcement 118 includes support scaffold 136 with step-shaped geometric retaining features including axial treads 138 and radial risers 140. Shroud reinforcement 118 also includes reinforcing material 142. Shroud reinforcement 118 encloses transition section 132 of shroud 116. Support scaffold 136 is a series of geometric retaining features incorporated into a radially outer surface transition section 132 of shroud 116 such that the geometric retaining features encircle transition section 132. The retaining features of support scaffold 136 have a generally step-like geometry made of a series of axial treads 138 and radial risers 140. Axial treads 138 and radial risers 140 each have a longer dimension and a shorter dimension. Axial treads 138 are oriented so each longer dimension is generally parallel to axis X. Radial risers 140 are oriented so each longer dimension is generally perpendicular to axis X. Support scaffold 136 is made of alternating axial treads 138 and radial risers 140 connected to create the step-like geometry. Reinforcing material 142 couples to a radially outer surface of support scaffold 136. Reinforcing material 142 can be woven or wrapped around the radially outer surface of support scaffold 136.

Shroud 116 is typically made of a light-weight metal, like aluminum. Support scaffold 136 is typically integral to shroud 116 and made of the same material as shroud 116. Reinforcing material 142 is made of materials with high strength-to-weight ratios. Such materials include woven fibers like para-amid fibers (Kevlar), carbon fibers, nylon fibers, and combinations thereof. These high strength-to-weight ratio materials may also be combined or layered with a composite material like Onyx™, a micro carbon fiber filled nylon material, or another thermoset polymer. When the high strength-to-weight ratio materials are used with a composite material, the high strength-to-weight ratio material may be layered around support scaffold 136 first and then the composite material may be layered on top of the high strength-to-weight ratio material. Alternatively, the high strength-to-weight ratio material may be incorporated into the composite material so that the two materials form one layer. For example, fibers of a high strength-to-weight ratio material can be incorporated into a composite material to form reinforcing material 142.

In a first embodiment, reinforcing material is wrapped or woven around support scaffold 136. To manufacture shroud 116 with support scaffold 136, axial treads 138 and radial risers 140 can be machined into the radially outer surface of transition section 132. Alternatively, shroud 116 could be cast with axial treads 138 and radial risers 140 in transition section 132. Shroud 116 could also be additively manufactured with support scaffold 136. Reinforcing material 142 is then wrapped or woven around support scaffold 136. Reinforcing material 142 could be formed in layers, with the high strength-to-weight ratio material as a first layer in contact with support scaffold 136 and then the composite material covering the high strength-to-weight ratio material. Alternatively, the high strength-to-weight ratio material could be combined with the composite material during the weaving or wrapping process around support scaffold 136. For example, a high strength-to-weight ratio material and a composite material can be melted together and then wrapped or woven around support scaffold 136.

In a second embodiment, reinforcing material 142 is additively manufactured onto support scaffold 136. Shroud 116 could be machined, cast, or additively manufactured with support scaffold 136, as in the first embodiment. Then, reinforcing material 142 is additively manufactured around support scaffold 136. Reinforcing material 142 could be additively manufactured in layers such that a high strength-to-weight ratio material is additively manufactured onto support scaffold 136 and then a composite material is additively manufactured over the high strength-to-weight ratio material. Alternatively, reinforcing material 142 can be additively manufactured such that the high strength-to-weight ratio material and composite material are additively manufactured onto support scaffold 136 together. For example, a high strength-to-weight material and a composite material can be combined and used for 3D printing reinforcing material 142 onto support scaffold 136.

In a third embodiment, reinforcing material 142 is manufactured separately from shroud 116 and then bonded to transition section 132. Shroud 116 could be machined, cast, or additively manufactured with support scaffold 136, as in the first embodiment. Reinforcing material 142 is then manufactured separately from shroud 116 to form a sleeve that conforms with the geometric retaining features of support scaffold 136. Reinforcing material 142 could be additively manufactured, woven, wrapped, or molded into a shape that complements support scaffold 136. Reinforcing material 142 could alternatively have a layer of high strength-to-weight ratio material covered with a layer of a composite material or the high strength-to-weight ratio material and the composite material could be integral. After manufacturing, the sleeve of reinforcing material 142 can be slipped over shroud 116 such that the reinforcing material encircles transition section 132. Reinforcing material 142 is bonded to the radially outer surface of support scaffold 136 on transition section 132. The sleeve of reinforcing material 142 could also be held in place using retention features like snap rings. For example, a snap ring can be positioned around tubular section 130 of shroud 116. The snap ring is adjacent to a first side of reinforcing material 142 near first side 120 of rotor 114.

Rotary machine 110 compresses air. In rotary machine 110, rotating shaft 112 rotates rotor 114 within shroud 116. Air enters shroud 116 near tubular section 130 and moves through rotor 114 from first side 120 to radially outer edge 124. Rotor 114 increases the velocity of the air. Air exits rotor 114 near flange section 134 of shroud 116. Near flange section 134 of shroud 116, kinetic energy built from increased air velocity is changed into static pressure as air moves away from rotor 114. Compressed air moves out of rotary machine 110. Shroud reinforcement 118 counteracts circumferential forces moving radially outward from axis X within shroud 116. Such circumferential force could be from shroud 116 heating and expanding or, if rotor 114 fails, from pieces of rotor 114. Shroud reinforcement 118 provides containment for rotor 114 should rotor 114 mechanically fail.

Shroud reinforcement 118 reduces the total weight of rotary machine 110 while complying with airline safety standards for containment around rotor 114. Shroud reinforcement 118 improves the functionality of rotary machine 110 for use in aircraft because of the lower weight of high strength-to-weight ratio materials. Further, high strength-toweight ratio materials allow for containment of rotor 114 without added grams of materials, as discussed in relation to compressor shroud and turbine shroud in air cycle machine 10 (shown in FIG. 1).

Support scaffold 136 has a step-like geometry that holds shroud reinforcement 118 onto transition section 132 of shroud 116. Without support scaffold 136, reinforcing material 142 moves to a smaller radius area on shroud 116 when rotary machine 110 runs because shroud 116 expands and reinforcing material 142 does not stretch. When reinforcing material 142 shifts, any containment provided by reinforcing material 142 is not in a proper position to contain rotor 114. This reduces the overall weight of aircraft that the rotary machine is installed in.

Shroud 116 expands as rotary machine 110 operates and heats. Including shroud reinforcement 118 in rotary machine 110 reduces the amount shroud 116 expands. Reducing shroud 116 expansion keeps clearances between curved side 128 of rotor 114 and a radially inner surface of shroud 116 consistent even while rotary machine 110 heats. Keeping clearances within rotary machine 110 makes it more efficient.

Figure 4:
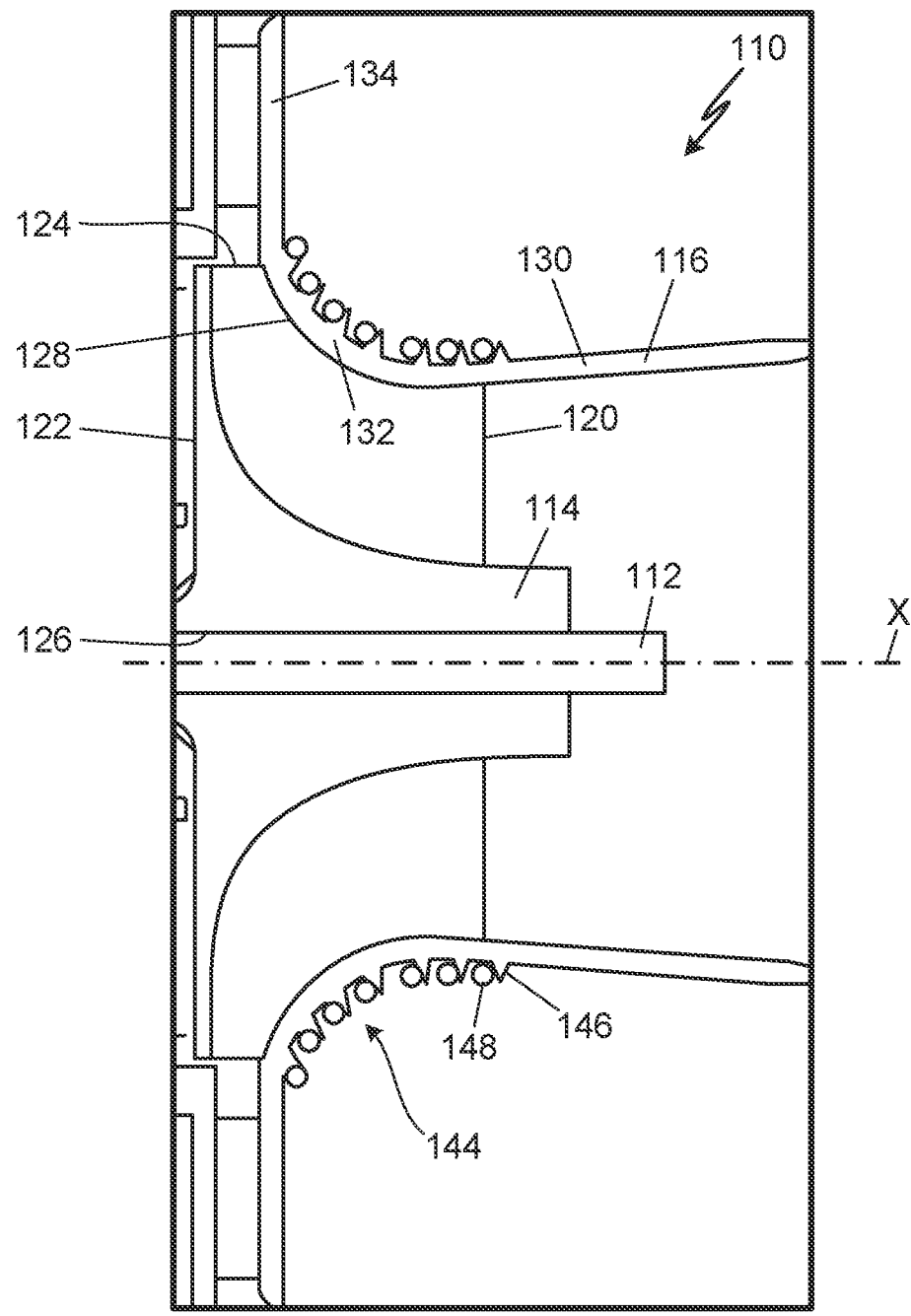
FIG. 4 is a cross-sectional view of a portion of a rotary machine with a second embodiment of a rotor containment structure.

FIG. 4 is a cross-sectional view of a portion of rotary machine 110 with shroud reinforcement 144. Rotary machine 110 includes rotating shaft 112, rotor 114, shroud 116, and shroud reinforcement 144. Rotor 114 includes first side 120, second side 122, radially outer side 124, bore 126, and curved side 128. Shroud 116 includes tubular section 130, transition section 132, and flange section 134. Shroud reinforcement 144 includes support scaffold 146 made of geometric retaining features and reinforcing material 148. FIG. 4 also includes axis X.

Rotary machine 110 in FIG. 4 is the same as rotary machine 110 in FIG. 3. Rotary machine 110 is configured like compressor section 12 in air cycle machine 10 (shown in FIG. 1). Rotary machine 110 could alternatively be a turbine, like turbine section 14 (shown in FIG. 1), or any other rotary machine. Rotating shaft 112 is colinear with and rotates about axis X. Rotor 114 is mechanically tied to rotating shaft 112. Shroud 116 colinear with and partially surrounds rotor 114. Shroud reinforcement 144 encircles and is connected to the radially outer surface of shroud 116. Shroud 116 and shroud reinforcement 144 make up a rotor containment structure.

Rotor 114 includes first side 120, second side 122, radially outer side 124, bore 126, and curved side 128. First side 120 is oriented toward the right of FIG. 3. Second side 122 is opposite first side 120. Radially outer side 124 is radially away from axis X. Bore 126 of rotor 114 is opposite radially outer side 124. Bore 126 is connected to rotating shaft 112. Curved side 128 is between first side 120 and radially outer side 124.

Shroud 116 includes tubular section 130, transition section 132, and flange section 134. Tubular section 130 extends axially past first side 120 of rotor 114. A first end of transition section 132 connects to tubular section 130 of shroud 116. Transition section 132 of shroud 116 adjacent to curved side 128 of rotor 114. Transition section 132 is much thinner than prior art transition section 92 (shown in FIG. 2). Flange section 134 of shroud 116 connects to a second end of transition section 132. Flange section 134 extends radially past outer side 124 of rotor 114.

Shroud reinforcement 144 includes support scaffold 146 and reinforcing material 148. Support scaffold 146 is a series of geometric retaining features incorporated into the radially outer surface of transition section 132. Each geometric retaining feature is a rib on the radially outer surface of shroud 116 such that the geometric retaining features encircle transition section 132. Support scaffold 146 shows geometric retaining features with triangular cross sections, however different geometrical shapes could be used to create the ribs. Support scaffold 146 is along transition section 132. Support scaffold 146 has the geometric retaining features spaced axially along transition section 132. Reinforcing material 148 is located between the geometric retaining features. Reinforcing material 148 is wrapped around transition section 132 between the coaxial bands of support scaffold 146. Reinforcing material 148 can also be woven both between support scaffold 146 and around a radially outer side of support scaffold 146, if necessary.

Rotary machine 110 operates in the same way as described in relation to FIG. 3. Rotary machine 110 heats as it operates and components that make up rotary machine 110 expand. Support scaffold 146 has a geometric design that keeps reinforcement material 146 on transition section 132 as shroud 116 expands. Shroud reinforcement 144 reinforces shroud 116 and provides appropriate containment should rotor 114 fail. Shroud reinforcement 144 counteracts circumferential forces moving radially outward from axis X within shroud 116. Such circumferential force could be from shroud 116 heating and expanding or, if rotor 114 fails, from pieces of rotor 114.

Shroud 116 is typically made of a light-weight metal, like aluminum. Support scaffold 146 is typically integral to shroud 116 and made of the same material as shroud 116. Reinforcing material 148 is made of materials with high strength-to-weight ratios. Such materials include woven fibers like para-amid fibers (Kevlar), carbon fibers, nylon fibers, and combinations thereof. These high strength-to-weight ratio materials may also be combined or layered with a composite material like Onyx™, a micro carbon fiber filled nylon material, or another thermoset polymer. When the high strength-to-weight ratio materials are used with a composite material, the high strength-to-weight ratio material may be layered around support scaffold 146 first and then the composite material may be layered on top of the high strength-to-weight ratio material. Alternatively, the high strength-to-weight ratio material may be incorporated into the composite material so that the two materials form one layer. For example, fibers of a high strength-to-weight ratio material can be incorporated into a composite material to form reinforcing material 142.

In a first embodiment, reinforcing material is wrapped or woven around support scaffold 146. To manufacture shroud 116 with support scaffold 146, axial treads 138 and radial risers 140 can be machined into the radially outer surface of transition section 132. Alternatively, shroud 116 could be cast with axial treads 138 and radial risers 140 in transition section 132. Shroud 116 could also be additively manufactured with support scaffold 146. Reinforcing material 148 is then wrapped or woven around support scaffold 146. Reinforcing material 148 could be formed in layers, with the high strength-to-weight ratio material as a first layer in contact with support scaffold 146 and then the composite material covering the high strength-to-weight ratio material. Alternatively, the high strength-to-weight ratio material could be combined with the composite material during the weaving or wrapping process around support scaffold 146. For example, a high strength-to-weight ratio material and a composite material can be melted together and then wrapped or woven around support scaffold 136.

In a second embodiment, reinforcing material 148 is additively manufactured onto support scaffold 146. Shroud 116 could be machined, cast, or additively manufactured with support scaffold 146, as in the first embodiment. Then, reinforcing material 148 is additively manufactured around support scaffold 146. Reinforcing material could be additively manufactured in layers such that a high strength-to-weight ratio material is additively manufactured onto support scaffold 146 and then a composite material is additively manufactured over the high strength-to-weight ratio material. Alternatively, reinforcing material 148 can be additively manufactured such that the high strength-to-weight ratio material and composite material are additively manufactured onto support scaffold 146 together. For example, a high strength-to-weight material and a composite material can be combined and used for 3D printing reinforcing material 142 onto support scaffold 136.

In a third embodiment, reinforcing material 148 is manufactured separately from shroud 116 and then bonded to transition section 132. Shroud 116 could be machined, cast, or additively manufactured with support scaffold 146, as in the first embodiment. Reinforcing material 148 is then manufactured separately from shroud 116 to form a series of rings that fit between the geometric retaining features of support scaffold 146. Reinforcing material 148 could be additively manufactured or molded into rings with diameters that form fit to shroud 116 between the geometric retaining features of support scaffold 146. Reinforcing material 148 could alternatively have a core of high strength-to-weight ratio material covered with a layer of a composite material or the high strength-to-weight ratio material and the composite material could be integral to form the rings. After manufacturing shroud 116 and reinforcing material 148, shroud 116 can be cooled, which will shrink the size of shroud 116, and the rings of reinforcing material 148 can be slipped over the geometric retaining structures of support scaffold 146 such that the bands of reinforcing material 148 encircle transition section 132. The shroud 116 can then be reheated to expand the size of shroud 116, which will cause the rings of reinforcing material 148 to fit against the radially outer surface of shroud 116. Reinforcing material 148 is bonded to the radially outer surface of support scaffold 146 on transition section 132. For example, shroud 116 could be manufactured from a lightweight metal with support scaffold 146. Then, reinforcing material 148 could be manufactured from a combination of high strength-to-weight material and composite material into rings with diameters to fit around the radially outer surface of transition section 132 between the geometric retaining features of support scaffold 146. The shroud would then be cooled to shrink the size of the shroud so the rings of reinforcing material 148 can slide over the geometric retaining features of support scaffold 146. When the shroud is no longer cooled, the rings can then fit tightly around transition section 132 between the geometric retaining features of support scaffold 146.

Shroud reinforcement 144 has many of the same benefits as shroud reinforcement 144. Shroud reinforcement 144 reduces the total weight of rotary machine 110 by utilizing high strength-to-weight ratio materials like para-amid fibers and carbon fibers. A lower weight machine increases the efficiency of aircraft utilizing the machine. Support scaffold 148 also has a geometry (coaxial bands with triangle-shaped cross sections that create ribs on the radially outer surface of shroud 116) that holds reinforcing material 148 in the proper place on shroud 116. Support scaffold 146 holds reinforcing material 148 onto transition section 132 of shroud 116 where containment of rotor 114 is most necessary. Support scaffold 146 also conforms to transition section 132 of shroud 132, further reducing the weight of shroud reinforcement 144 and rotary machine 110. Including rotor containment 144 also reduces the amount that shroud 116 expands when rotary machine 110 operates, keeping clearances within rotary machine 110 consistent. This makes rotary machine 110 more efficient.

DISCUSSION OF POSSIBLE EMBODIMENTS

The following are non-exclusive descriptions of possible embodiments of the present invention.

A containment structure for a rotor includes a shroud and a shroud reinforcement. The shroud is coaxial with and partially surrounds the rotor and includes a tubular section, a transition section, and a flange section. The tubular section extends axially past a first side of the rotor. The transition section connects to the tubular section and is adjacent to a curved side of the rotor. The flange section connects to the transition section opposite the tubular section. The flange section extends radially past a radially outer side of the rotor. The shroud reinforcement is connected to a radially outer surface of the transition section. The shroud reinforcement encloses the transition section and includes a support scaffold and a reinforcing material. The support scaffold includes a series of geometric retaining features encircling a radially outer surface of the transition section. The reinforcing material couples to the support scaffold and restricts shroud radial expansion.

The containment structure of the preceding paragraph can optionally include, additionally and/or alternatively, any one or more of the following features, configurations and/or additional components:

A further embodiment of the foregoing containment structure wherein the geometric retaining features are adjacent to one another and spaced axially along the shroud.

A further embodiment of any of the foregoing containment structures wherein the geometric retaining features of the support scaffold include axial treads with a longer dimension and a shorter dimension, and radial risers with a longer dimension and a shorter dimension. The longer dimension of the axial treads runs axially. The longer dimension of the radial risers runs radially. Each of the retaining features attaches to adjacent retaining features creating a step-like geometry.

A further embodiment of any of the foregoing containment structures wherein the reinforcing material is wrapped around a radially outer side of the support scaffold.

A further embodiment of any of the foregoing containment structures wherein the reinforcing material is woven around a radially outer side of the support scaffold.

A further embodiment of any of the foregoing containment structures wherein the geometric retaining features are spaced axially along the transition section of the shroud, and wherein the reinforcing material is between the geometric retaining features of the support scaffold.

A further embodiment of any of the foregoing containment structures wherein the reinforcing material is made from materials chosen from the group consisting of para-amid fibers, carbon fibers, thermoset polymer, micro carbon fiber filled nylon, and combinations thereof.

A further embodiment of any of the foregoing containment structures wherein the reinforcing material includes a first layer of material adjacent to the support scaffold and a second layer of material surrounding the first layer of material.

A further embodiment of any of the foregoing containment structures wherein the shroud and the support scaffold are integral.

A rotary machine includes a compressor section, a turbine section, and a shaft. The compressor section includes a compressor housing, a compressor rotor, a diffuser, and a compressor shroud. The compressor housing has a compressor inlet, a compressor outlet, and a compressor duct between the compressor inlet and the compressor outlet. The compressor rotor is in the compressor duct. The diffuser is in the compressor duct downstream from the compressor rotor. The compressor shroud is connected to the compressor housing near the compressor inlet and the diffuser. The compressor shroud is coaxial with the compressor rotor. The turbine section is connected to the compressor section and includes a turbine housing, a turbine rotor, a turbine shroud, turbine nozzle, and a turbine shroud reinforcement. The turbine housing includes a turbine inlet, a turbine outlet, and a turbine duct between the turbine inlet and the turbine outlet. The turbine rotor is in the turbine duct. The turbine shroud is coaxial with and partially surrounds the turbine rotor and connects to the turbine housing. The turbine shroud reinforcement encircles a section of the turbine shroud. The turbine shroud reinforcement includes a first support partially enclosing the turbine shroud and a first reinforcing material coupled to the first support scaffold. The first reinforcing material restricts turbine shroud radial expansion. The shaft mechanically connects the compressor rotor and the turbine rotor.

The rotary machine of the preceding paragraph can optionally include, additionally and/or alternatively, any one or more of the following features, configurations and/or additional components:

A further embodiment of the foregoing rotary machine and further including a compressor rotor containment structure on a radially outer surface of the compressor shroud. The compressor rotor containment structure includes a second support scaffold partially encircling the compressor shroud and a second reinforcing material coupled to the second support scaffold to restrict radial expansion of the shroud.

A further embodiment of any of the foregoing rotary machines wherein the first support scaffold is a series of geometric retaining features creating a step-like geometry encircling a curved transition section of the turbine shroud, and wherein the first reinforcing material is wrapped around a radially outer side of the first support scaffold.

A further embodiment of any of the foregoing rotary machines wherein the first support scaffold is a series of geometric retaining features spaced along a curved transition portion of the turbine shroud, and wherein the reinforcing material is between the geometric retaining features of the support scaffold.

A further embodiment of any of the foregoing rotary machines wherein the first reinforcing material is made from a material chosen from the group consisting of para-amid fibers, carbon fibers, thermoset polymer, micro carbon fiber filled nylon, and combinations thereof.

A further embodiment of any of the foregoing rotary machines wherein the turbine shroud and the first support scaffold are integral.

A shroud reinforcement partially surrounds a shroud. The shroud reinforcement includes a support scaffold and a reinforcing material. The support scaffold includes a series of geometric retaining features that encircle a section of the shroud. The bands are spaced axially along the shroud. The reinforcing material couples to the support scaffold. The reinforcing material restricts shroud radial expansion.

The shroud reinforcement of the preceding paragraph can optionally include, additionally and/or alternatively, any one or more of the following features, configurations and/or additional components:

A further embodiment of the foregoing shroud reinforcement wherein the geometric retaining features are connected to form a step-like structure encircling a radially outer surface of the shroud, and wherein the reinforcing material is woven around a radially outer surface of the support scaffold.

A further embodiment of any of the foregoing shroud reinforcements wherein the reinforcing material includes a first layer and a second layer. The first layer surrounds the support scaffold and is made from a material chosen from the group consisting of para-amid fibers, carbon fibers, and combinations thereof. The second layer surrounds the first layer and is made from a material chosen from the group consisting of thermoset polymer, micro carbon fiber filled nylon, and combinations thereof.

A further embodiment of any of the foregoing shroud reinforcements wherein the first layer and the second layer are integral.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A containment structure for a rotor, the rotor containment structure comprising:
   a shroud coaxial with and partially surrounding the rotor, the shroud comprising:
      a tubular section extending axially past a first side of the rotor;
      a transition section connected to the tubular section and adjacent to a curved side of the rotor; and
      a flange section connected to the transition section opposite the tubular section and extending radially past a radially outer side of the rotor; and
   a shroud reinforcement enclosing the transition section of the shroud, the shroud reinforcement comprising:
      a support scaffold comprised of a series of geometric retaining features encircling a radially outer surface of the transition section, wherein the geometric retaining features are spaced axially along the shroud, the geometric retaining features comprising:
         axial treads with a longer dimension and a shorter dimension, wherein the longer dimension runs axially; and
         radial risers with a longer dimension and a shorter dimension, wherein the longer dimension runs radially;
      wherein each of the retaining features attaches to adjacent retaining features creating a step-like geometry; and
      a reinforcing material coupled to the support scaffold to restrict radial expansion of the shroud.

2. The rotor containment structure of claim 1, wherein the reinforcing material is wrapped around a radially outer side of the support scaffold.

3. The rotor containment structure of claim 1, wherein the reinforcing material is woven around a radially outer side of the support scaffold.

4. The rotor containment structure of claim 1, wherein the reinforcing material is made from materials chosen from the group consisting of para-amid fibers, carbon fibers, thermoset polymer, micro carbon fiber filled nylon, and combinations thereof.

5. The rotor containment structure of claim 1, wherein the reinforcing material comprises:
 a first layer of material adjacent to the support scaffold; and
 a second layer of material surrounding the first layer of material.

6. The rotor containment structure of claim 1, wherein the shroud and the support scaffold are integral.

7. A rotary machine comprising:
 a compressor section comprising:
  a compressor housing with a compressor inlet, a compressor outlet, and a compressor duct between the compressor inlet and the compressor outlet;
  a compressor rotor in the compressor duct;
  a diffuser in the compressor duct downstream from the compressor rotor; and
  a compressor shroud connected to the compressor housing near the compressor inlet and the diffuser, wherein the compressor shroud is coaxial with the compressor rotor;
 a turbine section connected to the compressor section comprising:
  a turbine housing with a turbine inlet, a turbine outlet, and a turbine duct between the turbine inlet and the turbine outlet;
  a turbine rotor in the turbine duct;
  a turbine shroud coaxial with and partially surrounding the turbine rotor, wherein the turbine shroud is connected to the turbine housing;
  a turbine nozzle on a downstream portion of the turbine shroud;
  a turbine shroud reinforcement encircling a section of the turbine shroud, the turbine shroud reinforcement comprising:
   a first support scaffold partially enclosing the turbine shroud comprised of a series of geometric retaining features encircling a radially outer surface of the transition section, the retaining features comprising:
    axial treads with a longer dimension and a shorter dimension, wherein the longer dimension runs axially; and
    radial risers with a longer dimension and a shorter dimension, wherein the longer dimension runs radially;
    wherein each of the retaining features attaches to adjacent retaining features creating a step-like geometry; and
   a first reinforcing material coupled to the first support scaffold to restrict radial expansion of the turbine shroud; and
 a shaft mechanically connecting the compressor rotor and the turbine rotor.

8. The rotary machine of claim 7 further comprising:
 a compressor rotor containment structure on a radially outer surface of the compressor shroud, the compressor rotor containment structure comprising:
  a second support scaffold partially encircling the compressor shroud; and
  a second reinforcing material coupled to the second support scaffold to restrict radial expansion of the shroud.

9. The rotary machine of claim 8, wherein the second support scaffold is a series of geometric retaining features creating a step-like geometry encircling a curved transition section of the compressor shroud, and wherein the second reinforcing material is wrapped around a radially outer side of the second support scaffold.

10. The rotary machine of claim 7, wherein the first reinforcing material is made from a material chosen from the group consisting of para-amid fibers, carbon fibers, thermoset polymer, micro carbon fiber filled nylon, and combinations thereof.

11. The rotary machine of claim 7, wherein the turbine shroud and the first support scaffold are integral.

12. A shroud reinforcement partially surrounding a shroud, the shroud reinforcement comprising:
 a support scaffold comprised of a series of geometric retaining features, wherein the geometric retaining features encircle a section of the shroud, wherein the geometric retaining features are spaced axially along the shroud, and wherein the geometric retaining features comprise:
  axial treads with a longer dimension and a shorter dimension, wherein the longer dimension runs axially; and
  radial risers with a longer dimension and a shorter dimension, wherein the longer dimension runs radially;
  wherein each of the retaining features attaches to adjacent retaining features creating a step-like geometry; and
 a reinforcing material coupled to the support scaffold, wherein the reinforcing material restricts radial expansion of the shroud.

13. The shroud reinforcement of claim 12, wherein the reinforcing material is woven around a radially outer surface of the support scaffold.

14. The shroud reinforcement of claim 13, wherein the reinforcing material comprises:
 a first layer surrounding the support scaffold, wherein the first layer is made from a material chosen from the group consisting of para-amid fibers, carbon fibers, and combinations thereof; and
 a second layer surrounding the first layer, wherein the second layer is made from a material chosen from the group consisting of thermoset polymer, micro carbon fiber filled nylon, and combinations thereof.

15. The shroud reinforcement of claim 14, wherein the first layer and the second layer are integral.

* * * * *